(12) United States Patent
Wilkes (10) Patent No.: US 9,566,996 B2
(45) Date of Patent: Feb. 14, 2017

(54) TELESCOPIC ASSEMBLY

(71) Applicant: TRW Limited, Solihull (GB)

(72) Inventor: Mark Anthony Wilkes, Birmingham (GB)

(73) Assignee: TRW LIMITED, Solihull, West Midlands (GB)

( * ) Notice: Subject to any disclaimer, the term of this patent is extended or adjusted under 35 U.S.C. 154(b) by 0 days.

(21) Appl. No.: 14/906,952

(22) PCT Filed: Jul. 24, 2014

(86) PCT No.: PCT/GB2014/052265
§ 371 (c)(1),
(2) Date: Jan. 22, 2016

(87) PCT Pub. No.: WO2015/011479
PCT Pub. Date: Jan. 29, 2015

(65) Prior Publication Data
US 2016/0167692 A1    Jun. 16, 2016

(30) Foreign Application Priority Data

Jul. 24, 2013   (GB) .................................. 1313221.2

(51) Int. Cl.
*B62D 1/185*         (2006.01)
*B62D 1/19*          (2006.01)
(Continued)

(52) U.S. Cl.
CPC .............. *B62D 1/192* (2013.01); *B62D 1/185* (2013.01); *F16C 3/035* (2013.01); *F16D 3/065* (2013.01)

(58) Field of Classification Search
CPC .......... B62D 1/192; B62D 1/185; F16C 3/035; F16C 3/065
See application file for complete search history.

(56) References Cited

U.S. PATENT DOCUMENTS 4,708,499 A    11/1987   Löser et al.
6,168,530 B1 *  1/2001   Guimbal ................. B64C 27/12
                                                          384/498
(Continued)

FOREIGN PATENT DOCUMENTS

DE         10130908 A1     1/2003
DE     102005056308 B3     3/2007
(Continued)

OTHER PUBLICATIONS

Patent Act 1977: Search Report under Section 17(5), Application No. GB1313221.2 dated Jan. 31, 2014.
(Continued)

*Primary Examiner* — Drew Brown
(74) *Attorney, Agent, or Firm* — MacMillan, Sobanski & Todd, LLC (57) ABSTRACT

A telescopic assembly comprises a first portion and a second portion and a support bearing assembly that acts between the two portions; the two portions being able to move relatively along a common path during telescopic adjustment; the support bearing assembly being located between the two portions and locating the two portions relative to one another to remove free play between the two portions that would otherwise occur in at least one direction orthogonal to the telescopic movement; characterized in that the support bearing assembly is fixed in position between the two portions by a release mechanism that is arranged, in use, to cause the support bearing assembly to grip both the first and second portions when they are not moving telescopically, to automatically release that grip upon relative telescopic movement of the two portions that exceeds a predetermined distance, and to automatically re-engage.

20 Claims, 7 Drawing Sheets

(51) Int. Cl.
*F16C 3/035* (2006.01)
*F16D 3/06* (2006.01)

(56) References Cited

U.S. PATENT DOCUMENTS

| | | | | |
|---|---|---|---|---|
| 6,276,719 | B1 * | 8/2001 | Gartner | B62D 1/184 188/67 |
| 6,550,974 | B2 * | 4/2003 | Zoppitelli | F16C 23/084 384/498 |
| 6,799,779 | B2 * | 10/2004 | Shibayama | B62D 1/195 280/775 |
| 7,384,069 | B2 * | 6/2008 | Green | B62D 3/00 280/775 |
| 7,455,320 | B2 * | 11/2008 | Imamura | B62D 1/195 280/777 |
| 7,534,048 | B2 * | 5/2009 | Holman | F16C 23/06 384/535 |
| 7,607,696 | B2 | 10/2009 | Graf | |
| 8,317,403 | B2 * | 11/2012 | Nuissl | F16C 33/60 384/506 |
| 8,398,310 | B2 * | 3/2013 | Ehlert | F16C 23/08 384/477 |
| 2005/0006889 | A1 * | 1/2005 | Born | B62D 1/192 280/777 |

FOREIGN PATENT DOCUMENTS

| | | |
|---|---|---|
| DE | 102010012377 A1 | 9/2011 |
| EP | 0018448 A1 | 11/1980 |
| FR | 2586276 A1 | 2/1987 |
| GB | 2304172 A | 3/1997 |
| JP | 2007099260 A | 4/2007 |
| WO | 2008147287 A1 | 12/2008 |

OTHER PUBLICATIONS

PCT International Search Report and the Written Opinion, Application No. PCT/GB2014/052265 filed Jul. 24, 2014, Dated Nov. 12, 2014.

* cited by examiner

TELESCOPIC ASSEMBLY

CROSS-REFERENCE TO RELATED APPLICATIONS

This application is a national stage of International Application No. PCT/GB2014/052265, filed Jul. 24, 2014, the disclosures of which are incorporated herein by reference in entirety, and which claimed priority to Great Britain Patent Application No. 1313221.2, filed Jul. 24, 2013, the disclosures of which are incorporated herein by reference in entirety.

BACKGROUND OF THE INVENTION

This invention relates to an improved telescopic assembly, and in particular but not exclusively to a telescopic steering column shroud.

There are many applications in which it is desirable for an apparatus to be telescopic so that the length of the apparatus can be adjusted. One common application of a telescopic arrangement is the steering shaft for a vehicle, and another related application is the shroud that surrounds the steering shaft. By allowing part of the shaft or shroud to move telescopically over another, the steering assembly can be adjusted for reach. In a crash, where a driver impacts the steering wheel, this can also allow the wheel to move and by controlling the rate at which the telescopic movement occurs, it is possible to absorb the energy in the crash in a controlled manner.

BRIEF SUMMARY OF THE INVENTION

According to a first aspect, the invention provides a telescopic assembly comprising a first portion and a second portion and a support bearing assembly that acts between the two portions, the two portions being able to move relatively along a common linear path during telescopic adjustment, the support bearing assembly being located between the two portions and locating the two portions relative to one another to remove free play between the two portions that would otherwise occur in at least one direction orthogonal to the telescopic movement, characterised in the support bearing assembly is fixed in position between the two portions by a release mechanism that is arranged, in use, to cause the support bearing assembly to grip both the first and second portions when they are not moving telescopically, to automatically release that grip upon relative telescopic movement of the two portions that exceeds a predetermined distance, and to automatically re-engage that grip when the relative telescopic movement has subsequently stopped.

The first portion may comprise an inner tubular portion or an outer tubular portion, and the second portion may comprise the other of an inner portion and an outer portion, with an end of the inner portion fitting within an end of the outer portion, the support bearing assembly being located in the gap formed between the inner and outer portions.

The inner and outer portions may comprise tubes which are arranged around a common axis along which the telescopic movement occurs, and the support bearing assembly may permit relative rotation between the two portions as well as permitting axial telescopic movement.

The support bearing assembly may include an inner and outer annular bearing race, and a plurality of bearings located between the races. The bearings may comprise ball bearings or roller bearings, or a mixture of ball and roller bearings. The inner tubular portion may be fitted inside the inner annular race and the outer tubular portion may be fitted around the outer bearing race.

One of the bearing races may be fixed in position on the first portion, and the release mechanism may be arranged to releasably grip the other bearing assembly to the second portion. For instance, where the first portion is an outer tube, the outer bearing may be secured to the outer tube whilst the inner bearing can releasably moved relative to the second (inner) portion. In that case a part of the release mechanism is located between the inner race and the inner tube. Where first portion is an inner tube the inner bearing race may be fixed in position and the outer race releasably gripped by the release mechanism. In that case the part of the release mechanism may be located between the outer race and the outer tube.

The bearing race that is fixed to the first portion may engage the first portion through a resilient spacer. This ensures that a force is applied between the bearing race and the first portion, removing any free play.

The bearing race, or resilient spacer if provided, may be secured to the first portion so that they cannot move during normal use.

The release mechanism may include at least one gripper that contacts the second portion and at least one reaction member that acts between the bearing race and the gripper, the gripper in use securely gripping the second portion when the assembly is not moving telescopically, and automatically releasing its grip on the second portion when it is moving.

The gripper or each gripper may comprise a roller, which may be a metal rod. The roller, when only subject to a low force from the wedge, can rotate freely along the second portion but when subject to a high force, as occurs when the telescopic movement has stopped, can no longer slide and so grips the second portion. To enhance this grip the roller and second portion may each have a high friction surfaces.

Where the first and second portions are tubes, there may be at least two, and preferably at least three grippers located at spaced locations around the circumference of the second portion, each one associated with a respective reaction member.

The grippers may be arranged in opposed pairs, spaced apart along the second portion along the direction in which the assembly can telescope, each pair being associated with a common reaction member.

The release mechanism may include two or more reaction members, each reaction member being associated with two grippers. Each reaction member may comprise a first side that engages one gripper and a second side that engages the second gripper, the two sides extending away from each other on opposing sides of the bearing race and optionally being connected by a central region, each gripper in use being wedged between a respective side and the second portion. The sides may be tapered so that the gripper is wedged underneath the tapered side onto the second portion.

The reaction member may comprise an integral part of the bearing race, or may be separate from the bearing race. Where it comprises two parts that are not connected, each part may form a half of the bearing race, the two half bearing races together providing the race for the bearings when the assembly is stationary.

The release mechanism may also include a biasing means that is associated with each gripper, and which in use with no telescopic movement of the assembly, biases the gripper into a position where it is forced into engagement with the reaction member and the second portion, the biasing force being reacted in part by the reaction member and in part by the second portion. The biasing means may wedge the gripper between the reaction member and the second portion.

Where each reaction member is associated with two grippers, there may be two biasing means, each applying a forced opposed to the other one in a direction towards a respective reaction member, pushing them together onto the reaction member.

The release mechanism may be arranged so that when the assembly is moving telescopically, the two biasing means will apply a smaller force to the gripper than it does when it is not moving.

The release mechanism may further comprise a slide element which is a sliding fit onto the second portion and passes between the bearing assembly and second portion, the slide element having opposed ends, one end on each side of the bearing races, each end defining a respective stopper, each of the biasing means acting between a stopper and a respective gripper.

In an arrangement where the first and second portions are tubes, the slide element may comprise a hollow tubular collar that is a sliding fit onto the inner tube.

The slide element may include at least one opening in which a respective reaction member and associated pair of grippers are accommodated so that the grippers can contact the second portion.

The stoppers may comprise resilient lugs that extend out from the collar. A lock ring may be provided which is located around the collar between the lugs and forms a reaction surface against which the biasing means acts. Thus the biasing means may try to push the stopper away from the gripper. Because there is a stopper on each side of the bearing race, along with a respective biasing means on each side, the effect of the biasing means is to try to push the two stoppers away from each other, but because they are fixed relative to each other by being ends of a common collar, the result is that the biasing means reach an balanced position in which the grippers are pushed together onto the reaction member and in turn onto the second portion.

The biasing means may each comprise at least one spring. Each spring may comprise a coil spring or a wavy spring. The spring may apply a force that is generally in line with the direction along which the assembly can move telescopically.

Each spring may act upon the respective gripper through a release collar which forms part of the release mechanism. Where the first and second portions are tubular, the release collar may comprise a ring. An edge of the ring which contacts the gripper may be tapered so that the gripper is wedged between the edge and the second portion as a force is applied. The more it is wedged underneath the tighter it will be pressed onto the second portion.

The assembly may be arranged so that upon telescopic movement the bearing assembly moves in the direction of telescoping to cause the bearing assembly to engage the release collar before the gripper and reaction member have moved, subsequent movement of the assembly pushing the release collar away from the associated gripper and proving an alternative path for the biasing force directly from the biasing means through the wedge to the bearing assembly away from the gripper, and thereby releasing the grip of the gripper on the first portion allowing the gripper to move.

The release collar may include a protruding lip which the reaction member engages, the lip extending over the gripper.

By providing an alternative force path that bypasses the gripper, the force on the gripper is reduced and so the grip of the gripper on the second portion is reduced. This allows the gripper to move relative to the second portion. For instance, where it is a roller it allows the roller to slide or roll along the second portion when the telescopic movement occurs.

The amount of telescopic movement needed to release the grip of the grippers is set by the relative spacing between the release collars and bearing race when the assembly is at rest. This should be kept relatively small, say 2-5 mm or so. Only when the alternative path for the forces is established is the grip released.

On reaching the desired telescopic position, the biasing means will work to restore a balanced position in which the reaction member and the sliding collar are centrally located and the full force is applied to the gripper. The grippers will then again grip securely onto the second portion.

According to a second aspect, the invention provides a steering column assembly comprising a telescopic shroud having upper and lower portions that surround and support a telescopic steering shaft having upper and lower portions, one of the upper and lower portions of the shroud forming the first or second portion of a telescopic assembly of the first aspect of the invention and one of the upper and lower portions of the steering shaft forming the other of the first and second portions of the first aspect of the invention.

The second aspect therefore provides an arrangement in which a sliding support assembly securely supports the shaft within the shroud.

Other advantages of this invention will become apparent to those skilled in the art from the following detailed description of the preferred embodiments, when read in light of the accompanying drawings.

DETAILED DESCRIPTION OF THE INVENTION

Figure 1A:
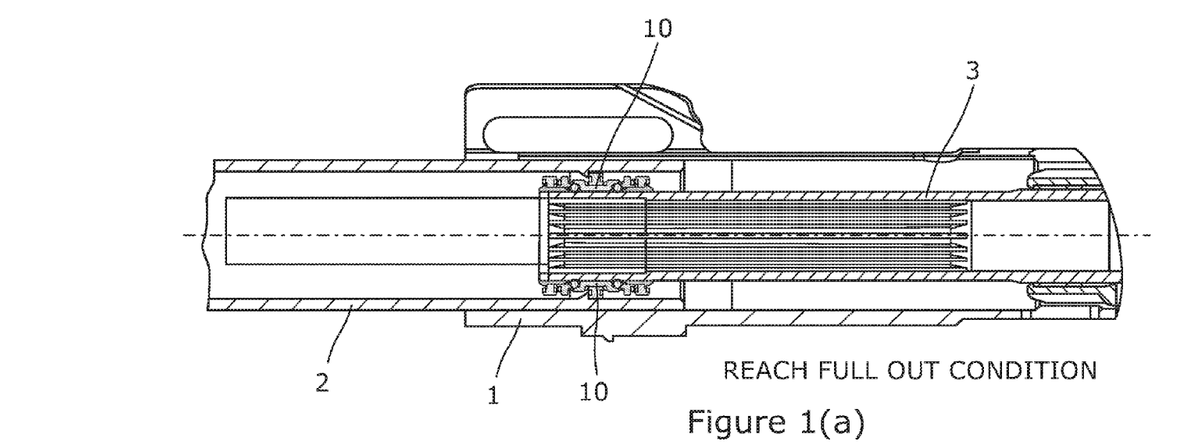
FIG. 1(a) provides a view of a part of an embodiment of a steering column assembly of the present invention prior to a collapse causing a telescopic movement.
Figure 1B:
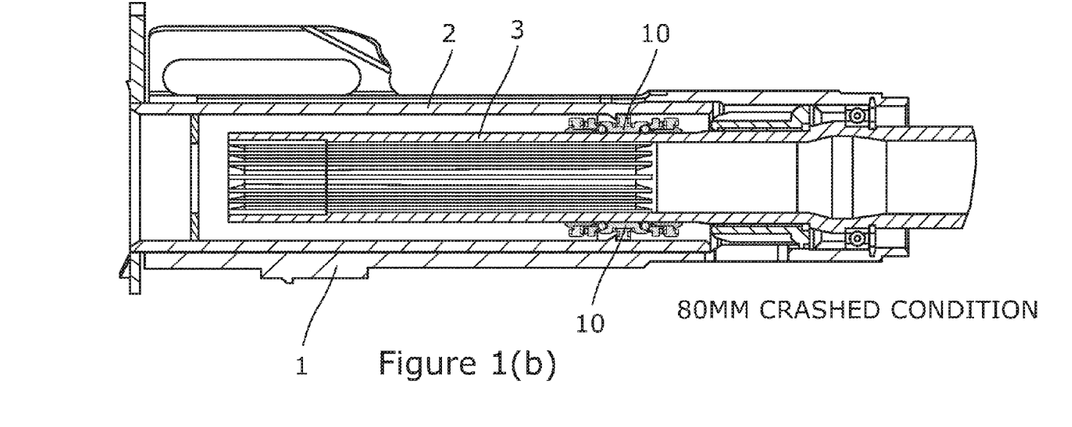
FIG. 1(b) provides the same view of FIG. 1(a) but after a full collapse of the assembly during a crash.

FIGS. 2(a) and (b) provides a view of a steering column assembly which includes a telescopic arrangement within the scope of one aspect on the present invention. The steering column assembly comprises a shroud 1, 2 which comprises a tubular upper shroud portion 1 and a tubular lower shroud portion 2, which are moveable relative to each other with the end of the upper shroud portion 1 being a sliding fit within an end of the lower shroud portion 2. The shroud 1, 2 surrounds a telescopic steering column shaft 3, 4. The shaft comprises an upper shaft portion 3 that at least partially surrounds a lower shaft portion 4, the two portions being connected through complimentary axially extending splines 5.

The upper shaft portion 3 supports a steering wheel (not shown) and the lower portion 4 is connected to a steering rack which in turn connects to the road wheels of the vehicle. In this arrangement the upper shaft fits over the lower shaft and the upper shaft portion 3 moves whilst the lower shaft portion 4 does not move axially. Similarly, the upper, outer, shroud portion 1 is located towards the steering wheel and slides over the lower, inner, shroud portion 2. The lower shroud portion 2 is axially fixed to a gearbox (not shown). The tubular upper shroud portion 1 may be secured to a fixed part of the vehicle using a clamp mechanism (not shown) that clamps onto a rail 6 on the upper shroud portion 1.

The space between the lower (outer) shroud portion 2 and the wall of the end of the upper shaft portion 3 of the steering shaft accommodates a support bearing assembly 10. This snugly fills the space and ensures that the shaft 3, 4 is located securely within the shroud 1, 2, providing support for the shaft 3, 4 close to the joint between the two shaft portions. In use the support bearing assembly 10 removes the free play that would other exist and this reduces the resonant frequency of the whole assembly compared with the same assembly without the support bearing assembly 10. This can provide a welcome improvement in the levels of NVH (noise, vibration and harshness) perceived by a user when the vehicle is travelling along a rough surface. The outer shroud portion 2, support bearing assembly 10 and shaft 3, 4 together form a telescopic assembly within the scope of the first aspect of the invention.

The support bearing assembly 10 provides several functions. When the steering assembly is locked in its preferred position of use, after it has been adjusted for reach, the support bearing assembly 10 applies a radial force to the outer wall of the shaft 3, 4 portion and onto the inner wall of the shroud 1, 2, and in doing so "grips" itself in position so that it cannot move axially along the shaft 3, 4 of its own accord. It must allow unimpeded rotation of the shaft 3, 4 within the shroud 1, 2. However, it cannot be securely and permanently fixed to the walls of both the shaft 3, 4 and shroud 1, 2 as this would prevent the support bearing assembly 10 from being telescopically adjusted.

To this end, the support bearing assembly 10 is fixed axially only to the shroud 1, 2 and is releasably gripping the shaft 3, 4 so it can move along the shaft 3, 4.

Figure 3:
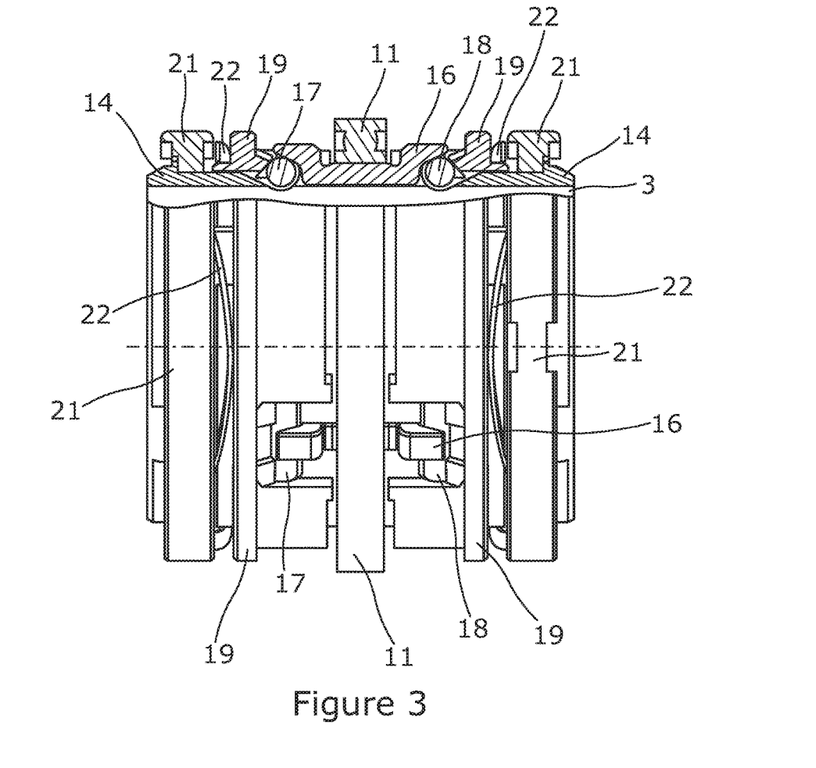
FIG. 3 is a view corresponding to FIG. 2 showing a practical implementation of the support assembly shown schematically in FIG. 2.
Figure 4A:
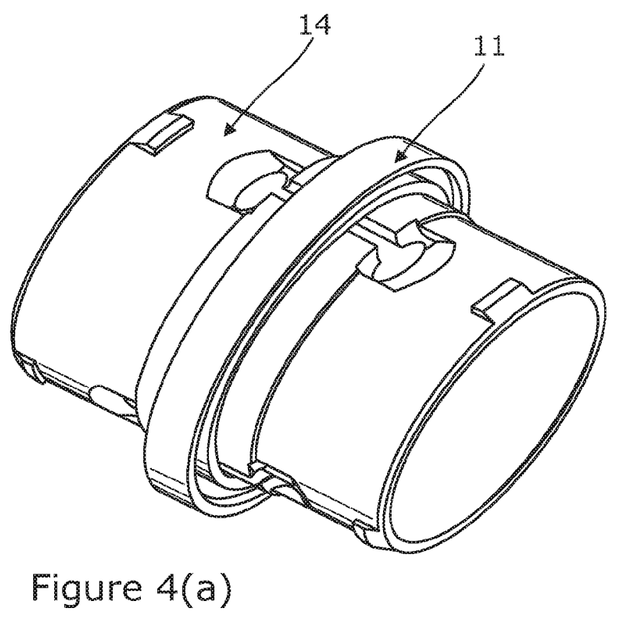
FIGS. 4(a) to (f) show the assembly of the various parts of the support bearing assembly prior to fitting to the steering assembly.
Figure 4B:
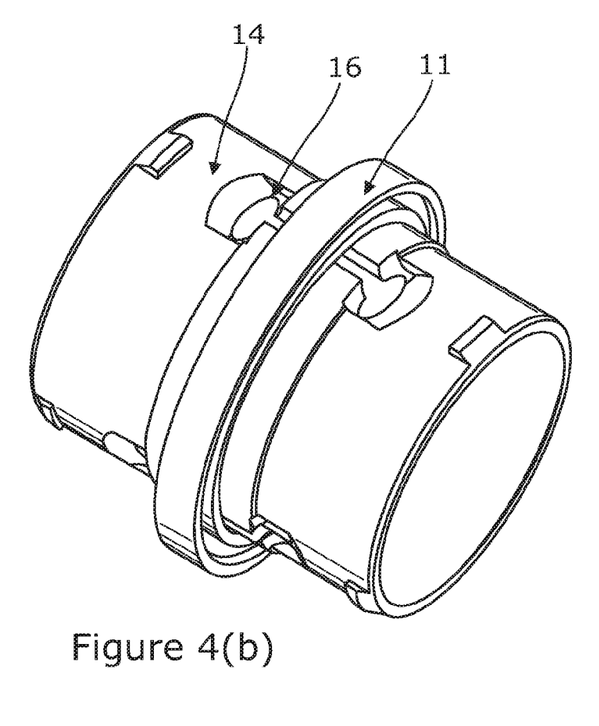
Figure 4C:
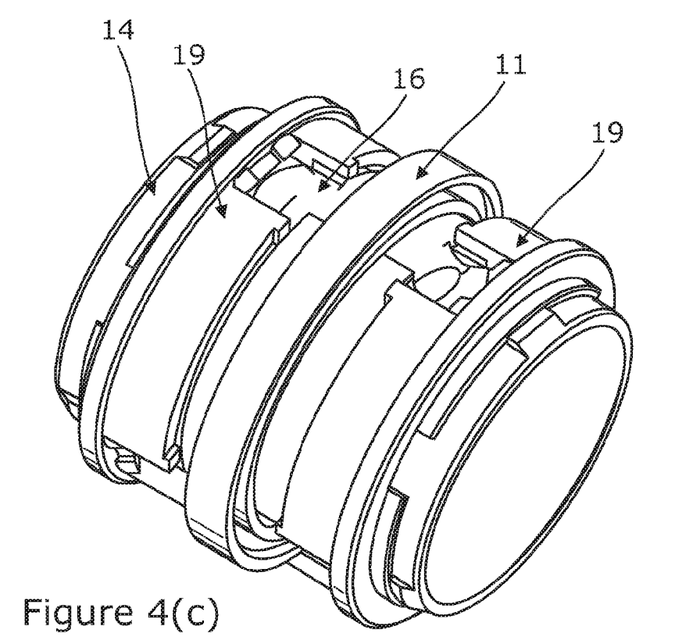
Figure 4D:
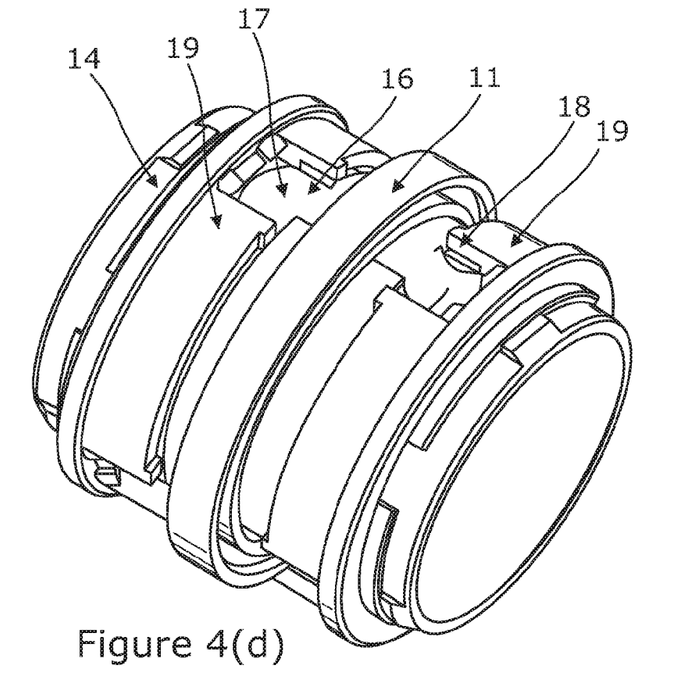
Figure 4E:
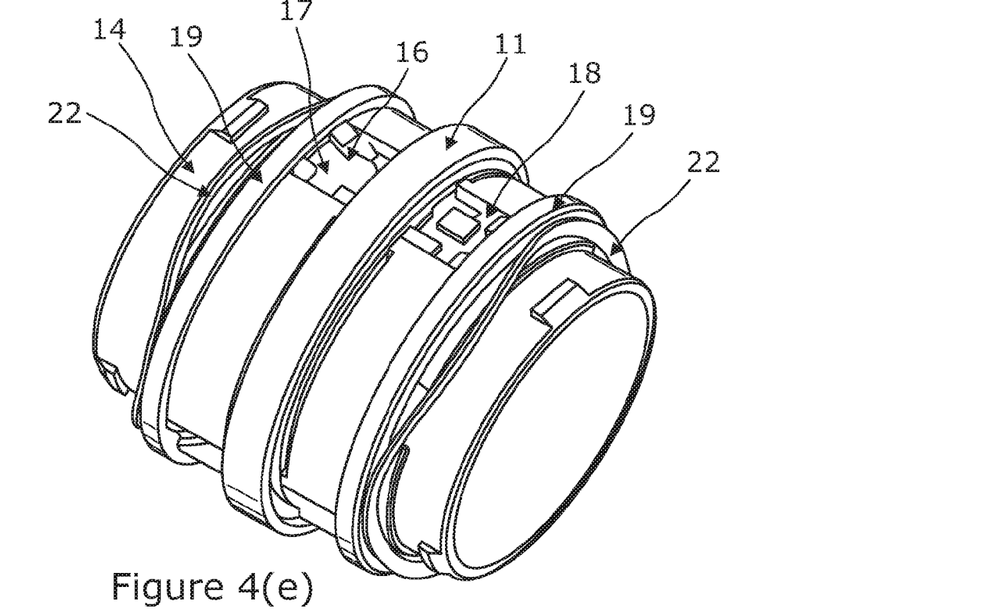
Figure 4F:
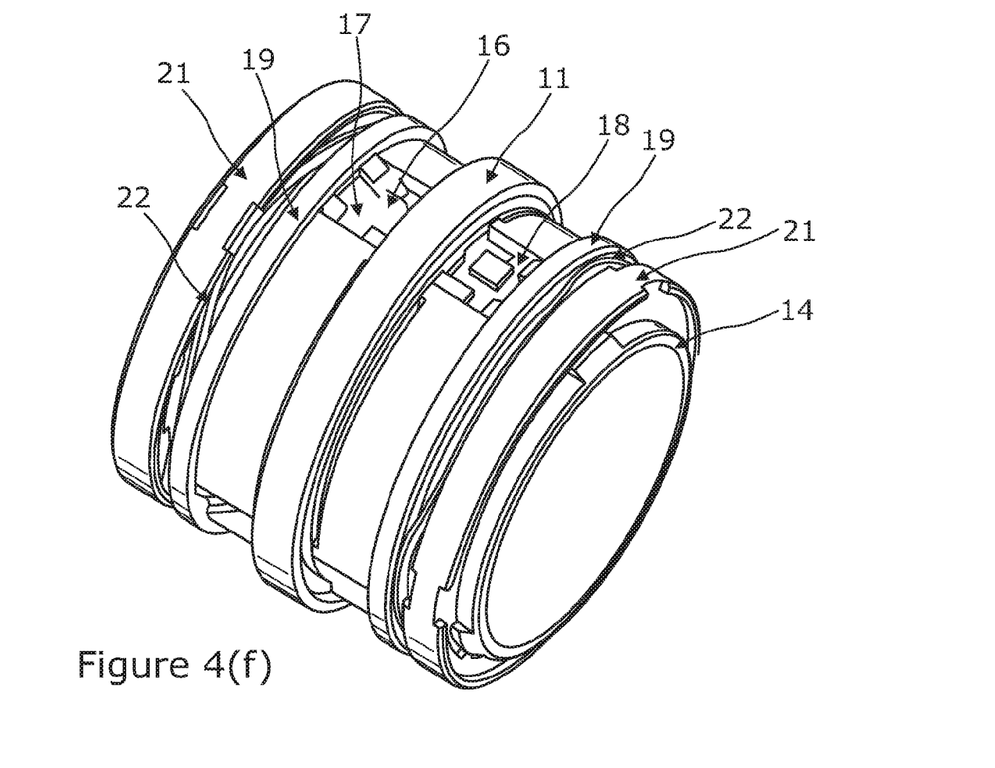

The support bearing assembly 10 is shown in more detail in FIGS. 3 and 4. It comprises a bearing assembly 11 having inner and outer races 12, 13 which extend around a common axis about which the shaft 3, 4 rotates, the inner peripheral surface of the inner race 12 facing the shaft and the outer peripheral surface of the outer race 13 facing the inside wall of the lower shroud portion 2. A set of ball bearings (not shown) run in tracks formed in the two bearing races 12, 13 in a conventional manner. The outer bearing race 13 is fixed to the inner wall of the shroud portion 2 in this example by a resilient sleeve 14 (best seen in FIG. 5) that hooks onto an end face of the inner shroud portion 2. The inner bearing race 12 is releasably fixed to the outer wall of the shaft 3 through a release mechanism.

The release mechanism holds the inner race in position and applies a force to the shaft 3, 4 to remove free play, yet automatically releases when the steering assembly is adjusted to release the force, ensuring that there is no excessive force resisting adjustment of the steering assembly. In this arrangement, the shroud 2 is a first portion within the meaning of the claims and the shaft 3 is in a second portion The reader will readily appreciate that this could be reversed, with the inner bearing race 12 fixed to the shaft and the outer bearing race 13 releasably fixed to the inner shroud portion 2 through the fixing mechanism.

Figure 2:
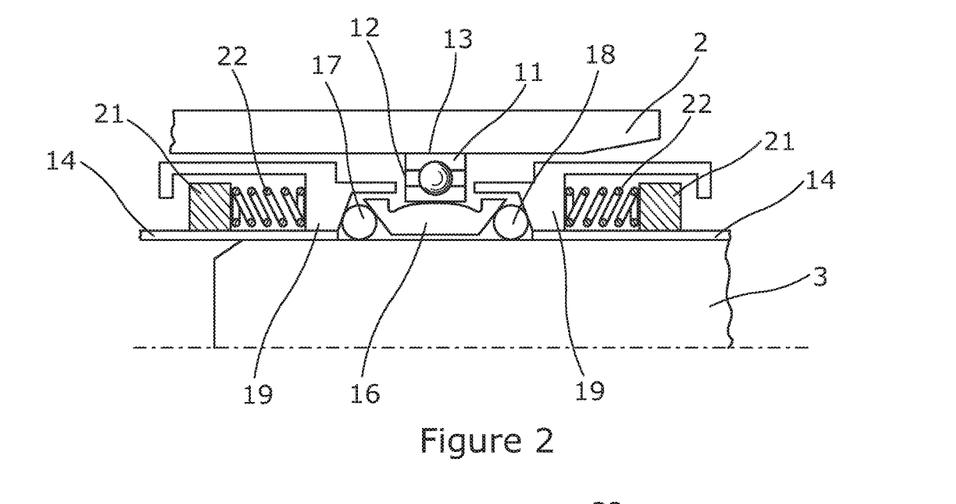
FIG. 2 is a schematic cross sectional view of one part of the support bearing assembly of FIG. 1.

FIG. 2 provides an enlarged cross sectional view of a portion of the support bearing assembly 10 of the present invention viewed as a schematic, while FIGS. 3 and 4 show a preferred implementation of the support bearing assembly 10. As can be seen in FIG. 2, the bearing race 12, 13 of the support bearing assembly 10 is fitted onto a sliding collar 14 which is a sliding fit onto the outer wall of the end of the upper steering shaft portion 3. This collar 14 forms a carrier for the various parts of the support bearing assembly 10. A thin layer of grease may be provided between the sliding collar 14 and the shaft 3, 4.

Three openings 15 are provided in the collar 14, spaced equi-distant around the collar 14, and within each opening is a reaction member 16 and two grippers 17, 18. Each gripper 17, 18 comprises a roller which contacts the shaft 3, 4.

Each reaction member 16 comprises two opposed side portions 16a, 16b that extend on opposing sides of the inner bearing race 12 and contact a respective gripper 17, 18. The underside of each side portion, which contacts the gripper 17, 18, is tapered so that the spacing between the underside and the shaft 3, 4 is greater at the tip of the side portion 16a, 16b and is smaller towards the centre region, defining a ramp or wedge. Each gripper 17, 18 is wedged under the tapered side portion in contact with the shaft 3 and is held in place by the walls of the opening 15 into which it is located. A force path therefore exists from the shaft 3, 4, through the rollers 17, 18 to the reaction member 16, and from the reaction member 16 through the bearing races 12, 13 and bearings to the shroud 2.

The side portions of the reaction member 16 are connected by a central region 16c which sits underneath the inner bearing race 12 and contacts the inner bearing race 12. The portion that contacts the inner bearing race 12 is crowned and provides a low friction contact with the inner bearing race 12 so that they can slide easily relative to one another.

Each roller 17, 18 is forced into a position underneath the tapered end portion of the reaction member 16 by a respective release collar 19. Each release collar 19 comprises a ring that loosely surrounds a respective opposing end of the sliding collar 14. An end face of the release collar 19 that engages the gripper is tapered, similar to the reaction member 16, so that the gripper 17, 18 is wedged under the tapered end face of the release collar 19 onto the shaft 3.

The sliding collar 14 is provided with outwardly extending lugs or stoppers 20 at each end and between the lugs and each release collar is a locking ring 21 and a spring 22. The spring 22 in this example comprises a wavy washer that is slid onto the sliding collar 14.

Each of the two release collars 19 is biased away from the stopper 20 at the end of the sliding collar 14 and towards the gripper 17, 18 by the spring 22 that forms a biasing means. This force is passed onto the gripper 17, 18, causing the release collar 19 to apply a biasing force to the gripper 17, 18 pushing it under the reaction member 16. The further it is pushed under the reaction member 16, the more it grips the shaft 3. The two springs 22 work against each other pushing the grippers 17, 18 towards one another and pushing the reaction member 16 into a central position under the bearing assembly 11.

When the steering is fixed axially in position, the gripper rollers 17, 18 are subject to equal forces from the two wavy springs 22 and are therefore thrust by equal amounts underneath the tapered ends of the reaction member 16 and the release collars 19. This causes the force from the basing means to be passed through the roller 17, 18 onto the shaft 3.

When the steering assembly is adjusted telescopically the equilibrium of the forces in disturbed. For instance, consider movement that would cause the outer shroud 2 to move to the left relative to the inner shroud portion 1 in the schematic shown in FIG. 2. The shroud 2 pulls the outer bearing race 13 and hence the inner bearing race 12 with it towards the left. The rollers 17, 18 initially remain pressed into the shaft and so the rollers 17, 18 do not slide along the shaft 3, 4 initially. After a predetermined amount of travel, the inner bearing race 12 strikes a protruding lip on one of the release collars 19, causing it to move away from the respective roller 17, 18. This causes the force from the biasing means to pass directly to the bearing assembly 11 without flowing through the roller 17, 18 and so removes the grip of the roller 17, 18 onto the shaft 3, 4. Further movement causes the other roller 18 to also release its grip. The bearing assembly 11, rollers 17, 18 and sliding collar 16 are then free to move along the shaft 3, 4.

Upon the axial movement stopping, the springs 22 will continue to apply a force to the release collars 19 and the sliding collar 14, causing the rollers 17,18 to be pushed back again under the reaction member 16 and to regain their grip on the shaft 3, 4 whilst moving the wedge back to its central position. The rollers 17, 18 then grip into the shaft 3, 4 to remove free play between the shaft 3, 4 and the inner shroud portion 2.

FIGS. 4(*a*) to (*f*) to show one possible method by which the support bearing assembly 10 can be assembled. First the bearing assembly 11 is pressed onto the slide collar 14, as shown in FIG. 4(*a*). In this position it sits over the three openings in the collar slide 14. In a next step, the three reaction members 16 are inserted into the openings 15 so that the central region contacts the inner bearing race 12. The release collars 19 are then slid onto the ends of the slide collar 14, followed by locating the rollers 17, 18 under the tapered ends of each reaction member 16. Once this is complete, the wavy springs 22 and finally the lock rings 21 are slid into place, the lock rings 21 engaging the resilient stoppers 20 on the ends of the sliding collar 14. In this position the wavy springs 22 are both compressed.

Figure 5:
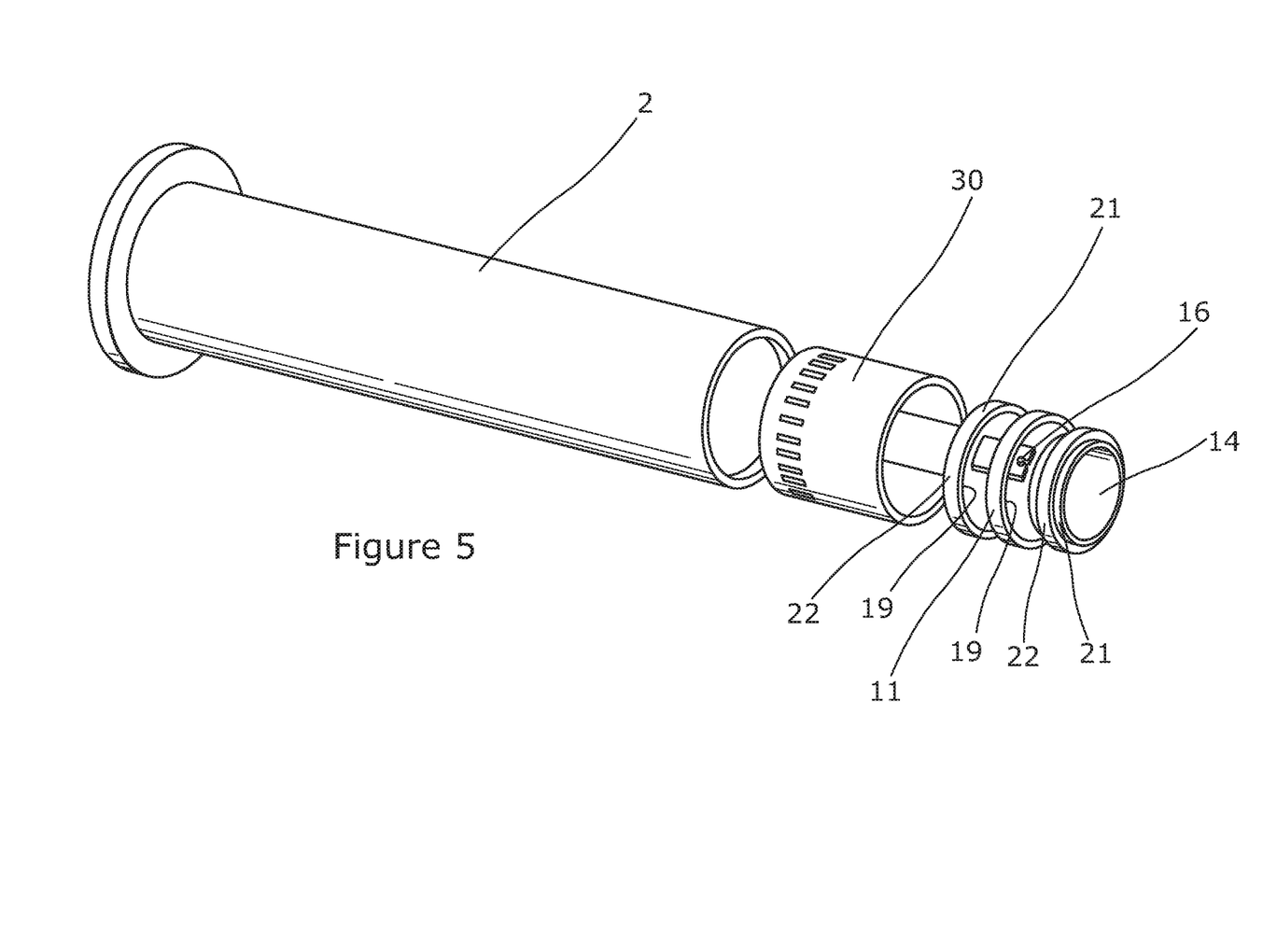
FIG. 5 shows the support bearing assembly being located between the shaft and shroud of the assembly of FIG. 1.

The partial assembly is then fitted into the resilient sleeve 30 that is pressed into the end of the inner shroud portion 2, and the steering shaft 3, 4 is threaded into the sliding collar 14 to complete the assembly as shown in FIG. 5.

Figure 6:
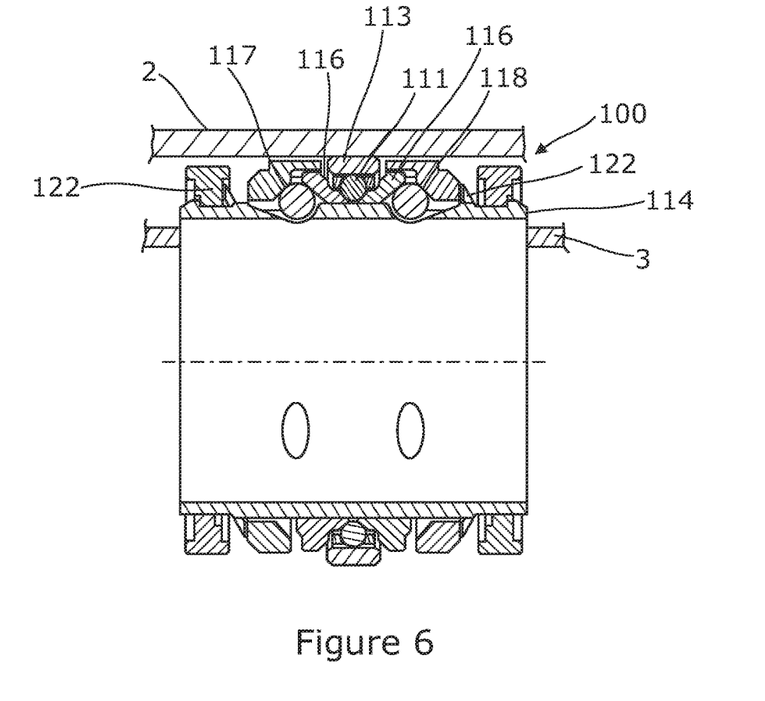
FIG. 6 shows an alternative embodiment of a support bearing assembly in an exploded view.
Figure 7:
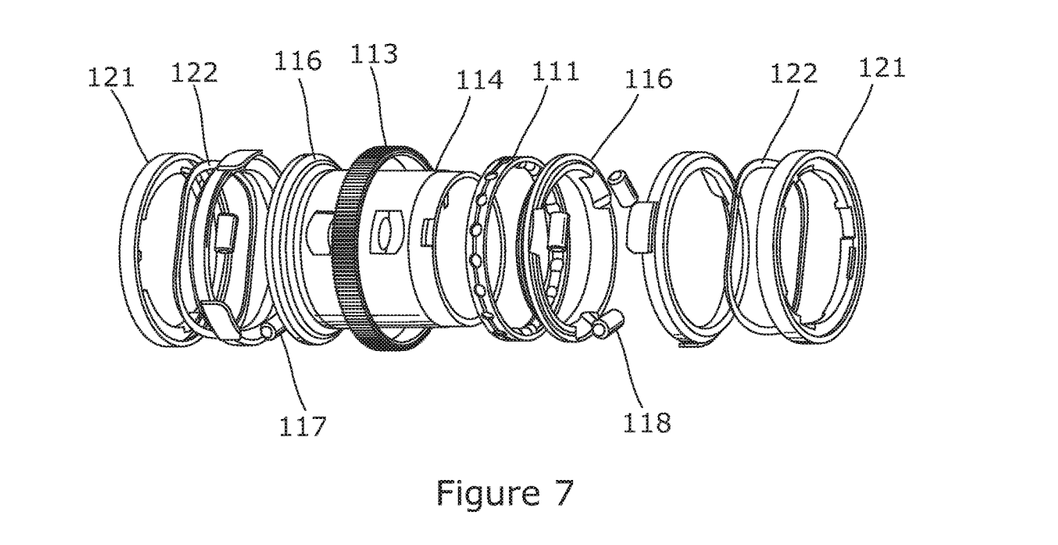
FIG. 7 is a cross sectional view of the support bearing assembly of FIG. 6 when assembled.

A second embodiment of a support assembly 100 is shown in FIGS. 6 and 7 of the accompanying drawings. Many parts are similar in function to those of the first embodiment and have been numbered with the same reference numerals as the first embodiment incremented by 100, i.e. bearing 11 in the first embodiment are the bearings labelled 111 in the second embodiment.

The key difference between this embodiment and the first embodiment is that instead of incorporating a standard deep groove bearing with a discrete resilient spacer, a manufactured bearing is used in which the inner race is in effect split in half so that the two halves can move apart during adjustment, giving the same effect as the use of a resilient spacer in that the pressure applied to the bearings 111 is released. To prevent the bearings from escaping they are retained in an annular cage that fits between the inner race and the outer race. Using a split inner race instead of a standard race and a resilient spacer can achieve a more compact arrangement, reducing the spacing required between the inner and outer tubes.

The skilled person will appreciate that although the embodiments shown are a steering column assembly, the invention has far wider application. The described embodiments should therefore be seen as a guide rather than limiting the scope of the invention, which should be determined from the accompanying claims when read in conjunction with the whole description.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A telescopic assembly comprising:
   a first portion and a second portion and a support bearing assembly that acts between the first and second portions;
   the first and second portions being able to move relatively along a common path during telescopic adjustment;
   the support bearing assembly being located between the first and second portions and locating the first and second portions relative to one another to remove free play between the first and second portions that would otherwise occur in at least one direction orthogonal to the telescopic movement;
   wherein the support bearing assembly is fixed in position between the first and second portions by a release mechanism that is arranged, in use, to cause the support bearing assembly to grip both the first and second portions when they are not moving telescopically, to automatically release that grip upon relative telescopic movement of the first and second portions that exceeds a predetermined distance, and to automatically re-engage that grip when the relative telescopic movement has subsequently stopped.

2. The telescopic assembly of claim 1, wherein the first portion comprises an inner tubular portion or an outer tubular portion, and the second portion comprises the other of an inner portion and an outer portion, with an end of the inner portion fitting within an end of the outer portion, the support bearing assembly being located in the gap formed between the inner and outer portions.

3. The telescopic assembly of claim 2, wherein the inner and outer portions comprise cylindrical tubes which are arranged around a common axis along which the telescopic movement occurs, and the support bearing assembly permits relative rotation between the first and second portions as well as permitting axial telescopic movement.

4. The telescopic assembly of claim 1, wherein the bearing assembly includes an inner and outer annular bearing race, and a plurality of bearings located between the races.

5. The telescopic assembly of claim 4 wherein one of the bearing races is fixed in position on the first portion, and the release mechanism is arranged to releasably grip the other bearing races to the second portion.

6. The telescopic assembly of claim 4, wherein the first portion is an outer tube, the outer bearing race is secured to the outer tube whilst the inner bearing race can releasably moved relative to the second (inner) portion.

7. The telescopic assembly of claim 6, wherein a part of the release mechanism is located between the inner bearing race and the inner tube.

8. The telescopic assembly of claim 4, wherein the first portion is an inner tube, the inner bearing race is fixed in position and the outer race releasably gripped by the release mechanism.

9. The telescopic assembly of claim 8, wherein part of the release mechanism is located between the outer race and the outer tube.

10. The telescopic assembly of claim 4, wherein the bearing race is fixed to the first portion and engages the first portion through a resilient spacer ensuring that a force is applied between the bearing race and the first portion, removing any free play.

11. The telescopic assembly of claim 10, wherein the bearing race, or resilient spacer, is secured to the first portion so that they cannot move during normal use.

12. The telescopic assembly of claim 1, wherein the inner tubular portion is fitted inside the inner annular race and the outer tubular portion may be fitted around the outer bearing race.

13. The telescopic assembly of claim 1, wherein the release mechanism includes at least one gripper that contacts the second portion and at least one reaction member that acts between the bearing race and the gripper, the gripper in use securely gripping the second portion when the assembly is not moving telescopically, and automatically releasing its grip on the second portion when it is moving.

14. The telescopic assembly of claim 13, wherein the gripper or each gripper comprises a roller.

15. The telescopic assembly of claim 14, wherein the roller, when only subject to a low force from the wedge, can rotate freely along the second portion but when subject to a high force, as occurs when the telescopic movement has stopped, can no longer slide and so grips the second portion.

16. The telescopic assembly of claim 13, wherein the release mechanism includes two or more reaction members, each reaction member being associated with two grippers.

17. The telescopic assembly of claim 16, wherein each reaction member comprises a first side that engages one gripper and a second side that engages the other gripper, the two sides extending away from each other on opposing sides of the bearing race and optionally being connected by a central region, each gripper in use being wedged between a respective side and the second portion.

18. The telescopic assembly of claim 13, wherein the release mechanism also includes a biasing means, such as a spring, that is associated with each gripper, and which in use with no telescopic movement of the assembly, biases the gripper into a position where it is forced into engagement with the reaction member and the second portion, the biasing force being reacted in part by the reaction member and in part by the second portion.

19. The telescopic assembly of claim 18, wherein the release mechanism further comprises a slide element which is a sliding fit onto the second portion and passes between the bearing assembly and second portion, the slide element having opposed ends, one end on each side of the bearing races, each end defining a respective stopper, each of the biasing means acting between a stopper and a respective gripper.

20. A steering column assembly comprising a telescopic shroud having upper and lower portions that surround and support a telescopic steering shaft having upper and lower portions, one of the upper and lower portions of the shroud forming the first or second portion of a telescopic assembly of claim 1 and one of the upper and lower portions of the steering shaft forming the other of the first and second portions of claim 1.

* * * * *